US008179599B2

(12) United States Patent
Jansen

(10) Patent No.: US 8,179,599 B2
(45) Date of Patent: May 15, 2012

(54) MICROSCOPE HAVING AN INCLINED OPTICAL AXIS AND THREE-DIMENSIONAL INFORMATION ACQUISITION METHOD

(75) Inventor: Maarten J. Jansen, Casteren (NL)

(73) Assignee: Mitutoyo Corporation, Kawasaki (JP)

( * ) Notice: Subject to any disclaimer, the term of this patent is extended or adjusted under 35 U.S.C. 154(b) by 844 days.

(21) Appl. No.: 12/230,233

(22) Filed: Aug. 26, 2008

(65) Prior Publication Data

US 2009/0059362 A1    Mar. 5, 2009

(30) Foreign Application Priority Data

Aug. 27, 2007   (JP) ................. 2007-219445

(51) Int. Cl.
*G02B 13/10* (2006.01)
(52) U.S. Cl. ...................... 359/433; 359/381
(58) Field of Classification Search .............. 359/433
See application file for complete search history.

(56) References Cited

U.S. PATENT DOCUMENTS

| | | | |
|---|---|---|---|
| 4,353,618 A * | 10/1982 | Hagner et al. ............ | 359/385 |
| 5,248,876 A | 9/1993 | Kerstens et al. | |
| 6,970,287 B1 | 11/2005 | Watkins et al. | |
| 7,678,584 B2 * | 3/2010 | Guedon et al. ............ | 436/527 |

FOREIGN PATENT DOCUMENTS

| | | |
|---|---|---|
| JP | A-9-113240 | 5/1997 |
| WO | WO 01/37025 A | 5/2001 |
| WO | WO 2007095090 A2 * | 8/2007 |

OTHER PUBLICATIONS

European Search Report dated Jan. 22, 2009 issued in European Patent Application No. 08 16 1938.

* cited by examiner

*Primary Examiner* — Arnel C Lavarias
(74) *Attorney, Agent, or Firm* — Oliff & Berridge, PLC

(57) ABSTRACT

An optical system includes an optical unit with an optical axis extending through a light transmissive sample embedded in a transparent substrate, to focus on the sample embedded in the substrate and to scan the sample according to the main plane of the transparent substrate. The optical axis extends under an angle unequal to zero relative to the normal of the main plane of the transparent substrate, in order to perform a volumetric observation of a sample by obtaining information items focused in all thickness directions within the sample, at a high speed, without requiring any movement along the thickness direction of the sample.

15 Claims, 4 Drawing Sheets

MICROSCOPE HAVING AN INCLINED OPTICAL AXIS AND THREE-DIMENSIONAL INFORMATION ACQUISITION METHOD

BACKGROUND

The present application claims priority to Japanese Patent Application No. 2007-219445 filed Aug. 27, 2007, the contents of which are incorporated herein by reference in their entirety.

The present disclosure relates to an optical system with an optical unit and an optical axis extending through a light transmissive sample embedded in a transparent substrate to focus on the sample that is embedded in the transparent substrate and to scan the sample according to the main plane of the transparent substrate.

The present disclosure relates to a microscope and a three-dimensional information acquisition method wherein projection light is projected onto a light-transmissive sample in order to observe the sample with the light of a focal plane. More particularly, the present disclosure relates to a microscope and a three-dimensional information acquisition method that allows continuous subsurface measurements of partially transmissible substrates while at the same time maintaining optimal focus throughout the entire measurement volume at a high speed.

The present disclosure also relates to a microscope and a three-dimensional information acquisition method that allows projection of a two-dimensional pattern in a three-dimensional volume, while both maintaining optimal focus in the three-dimensional volume and making a relative lateral scanning motion.

DESCRIPTION OF RELATED ART

Conventionally, a confocal scanning microscope as known in the art is widely used to obtain a picture of a sample by scanning a convergent light spot on the sample and imaging transmitted light, reflected light, fluorescence or similar light from the sample. Such a confocal scanning microscope is often employed for the configurational observation or physiological reaction observation of a living cell, the volumetric observation of the inner layer surface of a light-transmissive substance (transmitting substance), or similar applications in technical fields relevant to, for example, studying organisms and biotechnology. Since the confocal scanning microscope has a very high resolution namely on a Z-axis (in a depth direction), it can also be used for the acquisition of the three-dimensional information of a light-transmissive sample in addition to uses other than the ones described above.

FIG. 4 illustrates a configurational diagram of a prior-art confocal scanning microscope used for acquiring three-dimensional information of a sample. As shown in FIG. 4, the prior-art confocal scanning microscope 100 includes a transparent substrate 130 in which the sample is placed, a picture optical system 101 which acquires the picture of the sample on the basis of transmitted light, reflected light, or fluorescence from a focal plane 131 in the transparent substrate 130, and an objective 120 which images light exiting from the picture optical system 101, onto the focal plane 131.

As shown in FIG. 4, the picture optical system 101 in the confocal scanning microscope 100 also includes a light source 102, a collimator lens 103, a polarization plate 104, a pinhole member 105 and a polarizing beam splitter 106. The picture optical system 101 further includes an imaging lens 107, a ¼λ plate 108, a pinhole member 109, a relay lens 110 and a CCD device 111.

Under the conventional confocal scanning microscope 100 known in the art and configured as shown in FIG. 4, difficulties may exist when scanning the volume of a sample in the transparent substrate 130. When the entire size of the sample fits within the visual range of the picture optical system 101, the picture of the sample is acquired by moving the picture optical system 101 in a depth direction. In cases where the sample size extends beyond or outside of the visual range of the picture optical system 101, one way to acquire the picture of the sample is, for example, by moving the transparent substrate 130 on each of its three separate three-dimensional axes of: the X-direction, the Y-direction, and the Z-direction, as indicated by the arrows in FIG. 4, or by moving the picture optical system 101 in the Z-direction. Movement of the transparent substrate 130 on the three-dimensional separate motion axes of X- and Y-directions and a Z-direction is indicated by arrows in FIG. 4.

Therefore, in particular for cases in which the total sample size extends over a region larger than the visual range of the picture optical system 101, it is necessary to repetitively move the picture optical system 101 or the transparent substrate 130 along the Z-direction, followed by moving the transparent substrate 130 in the X- and Y-directions in correspondence with the next visual range, and then moving the picture optical system 101 or the transparent substrate 130 along the Z-direction again. Such a discontinuous operation of movements, as indicated by the broken line A in FIG. 4, is sometimes required. As a result, the quality of the focal points of the sample is affected by the scanning depth of the transparent substrate 130.

Apart from this example, according to a confocal scanning microscope disclosed in for example, JP-A-9-113240, the microscope in JP-A-9-113240 is one which needs motions on three-dimensional separate motion axes, white light formed of a continuous spectrum is employed as a light source, and a transmitting substance serving as a sample is arranged at a position which is spaced from the focal point positions of a lens. In addition, when the sample size extends outside of the visual range, the sample is moved, and a pinhole member is moved on an optic axis, whereby the three-dimensional shape or structure of the transmitting substance is detected as the individual-wavelength information of light by utilizing the dispersion characteristic of the transmitting substance and the chromatic aberration of the lens.

SUMMARY

In the manner described above, the prior-art confocal scanning microscope as shown above in FIG. 4 or the confocal scanning microscope stated in JP-A-9-113240 measures and obtains three-dimensional information from a sample by motions on each of the separate three-dimensional motion axes, in order to reach a configuration which is well suited to the volumetric observation, especially in the light-transmissive sample. The confocal scanning microscope as described in JP-A-9-113240 can easily detect three dimensional information of a light transmissive sample in real time. In this instance, light is transmitted through a pinhole member passed through the sample, and the confocal scanning microscope as described in JP-A-9-113240 measures each wavelength of light by an individual wavelength pattern which changes in accordance with the optical path length.

Nevertheless, with general microscopes including the prior-art confocal scanning microscope known in the art and described above, in a case, for example, where the refractive index n of the transparent substrate is about 1.5, there scarcely exists one point which is focused in the thickness direction of the sample. As a result, corrections with the objective or the like, or corrections through picture processing need to be made in order to obtain a picture of the sample. In addition, movement adjustments along the depth direction or movement adjustments on the three-dimensional separate motion axes may be required in some observation situations of the sample. In the case of the confocal scanning microscope stated in JP-A-9-113240, the pinhole member needs to be moved on the optic axis separately from the sample, with the result that three-dimensional movement adjustments are required. Therefore, because it still remains that the scanning mechanism of the confocal scanning microscope still requires a complicated set of operations and movement adjustments to obtain a picture of the sample, this presents the problem that the volumetric observation of the sample cannot be performed by obtaining information items focused in all the thickness directions within the sample, at a high speed.

Since each of the confocal scanning microscopes and the general microscopes has a structure in which a focal plane is always formed in parallel with the horizontal section of the sample, the focal plane is formed in the optimal state for only a certain scanning depth in the Z-direction. As a result, a problem exists for obtaining three-dimensional information based on clear picture information which is focused over the whole volume of the sample (the whole interior of the sample) (that is, focused over all the thickness directions of the sample), as opposed to merely one direction of the sample.

An object of the present disclosure is to provide a microscope and a three-dimensional information acquisition method in which the volumetric observation of a sample can be performed by obtaining information items focused in all thickness directions within the sample at a high speed without requiring any motion along the thickness direction of the sample.

The present disclosure provides a system of the type described above wherein the optical axis extends under an angle different from 0° relative to the normal of the main plane of the transparent substrate.

A microscope according to an aspect of the present disclosure includes a microscope wherein projection light is projected onto a light-transmissive sample, the light-transmissive sample being observed with light of a focal plane of the microscope; a picture optical system which projects the projection light onto the sample supported in a transparent substrate so that an optic axis of the projection light may have a predetermined inclination to the transparent substrate, and which reads the light of the focal plane so as to acquire three-dimensional information of the sample; and a wedge-shaped correction region which has a refractive index substantially equal to that of the transparent substrate, provided in a wedge shape so that the focal plane orthogonal to the optic axis of the projection light from the picture optical system may be formed for the sample supported in the transparent substrate.

According to the above described configuration, the projection light is projected so that its optic axis may have the predetermined inclination to the transparent substrate, and the focal plane for the sample that is substantially orthogonal to the optic axis is formed by the wedge-shaped correction region. Therefore, motion of the picture optical system along the thickness direction of the sample is unnecessary for the sample in the transparent substrate, and information items focused in all thickness directions within the sample can be obtained at a high speed. Thus, the volumetric observation of the sample or the acquisition of three-dimensional information can be performed with ease and at a high speed.

In an optical system according to the disclosure, the optical unit, which may comprise the light source referred to above, is moved relative to the substrate. This can be accomplished by moving the substrate and having the optical system immobile, by moving the optical unit while having the substrate immobile or by moving both substrate and optical unit. In an embodiment of the present disclosure, a three dimensional coverage of the substrate may be achieved by only a two dimensional relative movement between the substrate and the optical unit, allowing a more simple construction and quicker scanning.

Herein the angle between the normal to the main plane of the substrate or the scanning plane and the optical axis depends on the depth of the substrate to be scanned and the width of the focal plane of the optical system. The sine of this angle is equal to the ratio between the depth of the substrate and the width of the focal plane.

The optical system can be formed by a scanning microscope with an opto-electronic transducer adapted to receive light according to the optical axis from the sample embedded in the transparent substrate.

However the optical system may also comprise of a light source adapted to emit light according to the optical axis to the sample embedded in the transparent substrate. In this configuration, the light source may serve to illuminate the substrate and/or the sample embedded within the substrate. In such an embodiment it is preferred that the movement of the light source and the movement of the scanning microscope relative to the substrate are synchronized in such a manner that the part of the substrate intended to be scanned is illuminated. This last feature may be of importance if the system as a whole is adapted to read from or write into a digitally readable pattern in an optical digital information carrier.

It is also possible that the light source serves another purpose such as selectively change the chemical properties of the medium in the substrate. This is in particular applicable when the substrate is formed by a liquid which is cured by light as is the case in rapid prototyping.

According to an embodiment of the present disclosure, a substantially wedge shaped transparent compensation body is arranged in the optical axis between the optical system and the transparent substrate, wherein the refraction index of the compensation body is substantially equal to the refraction index of the transparent substrate and one of the planes of the compensation body is arranged parallel to the main plane of the transparent substrate and another plane of the compensation body is arranged perpendicular to the optical axis. By this transparent compensation body the optical properties of the optical path between the optical unit and the substrate are homogeneous over the full width of the beam between the transparent compensation body and the optical unit, thus minimizing aberrations. It is noted that the expression 'substantially equal to' is understood to comprise deviations of less than 20%, preferably less than 10% and most preferably less than 5% between the refractive indices of the materials of the substrate and of the compensation body.

Aberrations are even further reduced when the compensation body is arranged in contact with the transparent substrate, as this makes the distribution of the optical properties over the length of the optical path even more homogeneous.

In a microscope according to the present disclosure, the wedge-shaped correction region is made of a light-transmissive wedge-shaped correction plate which is arranged on the transparent substrate on a side of the picture optical system. Since the wedge-shaped correction region is formed in such a wedge shape, an entrance plane for the projection light from the picture optical system becomes parallel to the focal plane, while an exit plane for the projection light onto the transparent substrate becomes parallel to a surface of the transparent substrate.

In an optical system and microscope according to the present disclosure, it is preferred that the transparent substrate is arranged in a manner so as to be movable in two-dimensional moving directions; and the picture optical system is configured so as to be relatively movable during the projection of the projection light onto the sample.

With such a configuration, since the picture optical system is configured in a manner so as to be relatively movable in either of the same directions as the moving directions and a direction parallel to the focal plane, there is no concern that the movability of the picture optical system might be impaired in cases where the transparent substrate is not moved in any of the moving directions. In other words, movement of the picture optical system is not restricted by the position of the transparent substrate.

It is preferred that the wedge-shaped correction plate is arranged so as to be movable relative to the transparent substrate on the surface of the transparent substrate, and arranged so as not to move relative to the transparent substrate in a case where the picture optical system is moved in a direction parallel to the focal plane.

In an optical unit and microscope according to the present disclosure, the picture optical system is moved in the parallel direction during the projection of the projection light onto the sample, thereby to acquire the three-dimensional information of the sample at the focal plane which is formed by a moving locus of a focus of the projection light.

In another aspect of the present disclosure, the optical system and microscope may be configured to further include an illumination system arranged on a side opposite to the picture optical system with the transparent substrate interposed therebetween, which projects illumination light having an optic axis parallel to that of the projection light; and a subsidiary wedge-shaped correction region which is disposed to be symmetrical to the wedge-shaped correction region with respect to the optic axis of the projection light, with the transparent substrate interposed therebetween, the subsidiary wedge-shaped correction region having a refractive index substantially equal to that of the transparent substrate, and provided in a wedge shape so that the focal plane may be arranged orthogonally to the optic axis of the illumination light from the illumination system.

In this configuration, the subsidiary wedge-shaped correction region is made of a light-transmissive subsidiary wedge-shaped correction plate and arranged on the transparent substrate on a side of the illumination system. The subsidiary wedge-shaped correction region is formed in a wedge shape such that an entrance plane for the illumination light from the illumination system becomes parallel to the focal plane, while an exit plane for the illumination light onto the transparent substrate becomes parallel to the surface of the transparent substrate.

Further, in the microscope according to the present disclosure, each of the wedge-shaped correction region and the subsidiary wedge-shaped correction region comprising a correction body may well be formed by a liquid contained in a container, the liquid having substantially the same refractive index as the transparent substrate. Herein it is noted that in case of a correction body with an oblique upper surface, the optical unit may extend into the liquid, and the path of the optical unit may be adapted to obtain the differences in optical paths in the different positions during scanning. It will be clear that the word 'correction body' as described above is meant to be understood as a body substantially of liquid, wherein the shape of the body is obtained by the enclosure of the liquid.

A three-dimensional information acquisition method according to an aspect of the present disclosure comprises a three-dimensional information acquisition method wherein projection light is projected onto a sample and three-dimensional information of the light-transmissive sample is acquired with light of a focal plane, characterized by disposing a wedge-shaped correction region which has a refractive index substantially equal to that of a transparent substrate, and which is in a wedge shape such that an optic axis of the projection light from a picture optical system has a predetermined inclination to the sample supported in the transparent substrate, and that the focal plane orthogonal to the optic axis is formed; and acquiring the three-dimensional information of the sample by projecting the projection light from the picture optical system through the wedge-shaped correction region and reading the light of the focal plane.

According to the above configuration, the wedge-shaped correction region or correction body with which the optic axis of the projection light from the picture optical system has the predetermined inclination to the transparent substrate and with which the focal plane orthogonal to the optic axis is formed is disposed about the sample supported in the transparent substrate, whereupon the three-dimensional information of the sample is acquired by projecting the projection light through the wedge-shaped correction region or correction body and reading the light of the focal plane. Therefore, any motion along the thickness direction of the sample is unnecessary for the sample in the transparent substrate, and the three-dimensional information of the sample can be acquired by obtaining information items focused in all thickness directions within the sample, at a high speed.

Furthermore, a three-dimensional information acquisition method according to the present disclosure may be configured in such a manner that the transparent substrate is arranged so as to be movable in two-dimensional moving directions, and the picture optical system is configured so as to be movable in the same directions as the moving directions of the transparent substrate, in addition to a direction parallel to the focal plane, during the projection of the projection light onto the sample. As a result, in a case where the entire sample size exists or extends outside of the visual range of the picture optical system, the light of the focal plane can be read by moving the picture optical system in the parallel direction to obtain the three-dimensional information of the sample, while the picture optical system is moved again by moving the transparent substrate a predetermined magnitude in the moving directions, to obtain the three-dimensional information of the sample.

With such a configuration, since the transparent substrate is configured to be moveable in two-dimensional X- and Y-directions, and the picture optical system is configured to be moveable in the two-dimensional X- and Y-directions, in addition to a direction parallel to the focal plane during projection of light upon the sample, it is possible to provide a microscope and a three-dimensional information acquisition method in which information items focused in all thickness directions within a sample are obtained at a high speed without requiring any motion along the thickness direction of the sample, thus allowing volumetric observation of the sample and the acquisition of three-dimensional information to be performed with ease.

DETAILED DESCRIPTION OF THE PREFERRED EMBODIMENT

An embodiment of the present disclosure will be described below with reference to the attached drawings.

Figure 1:
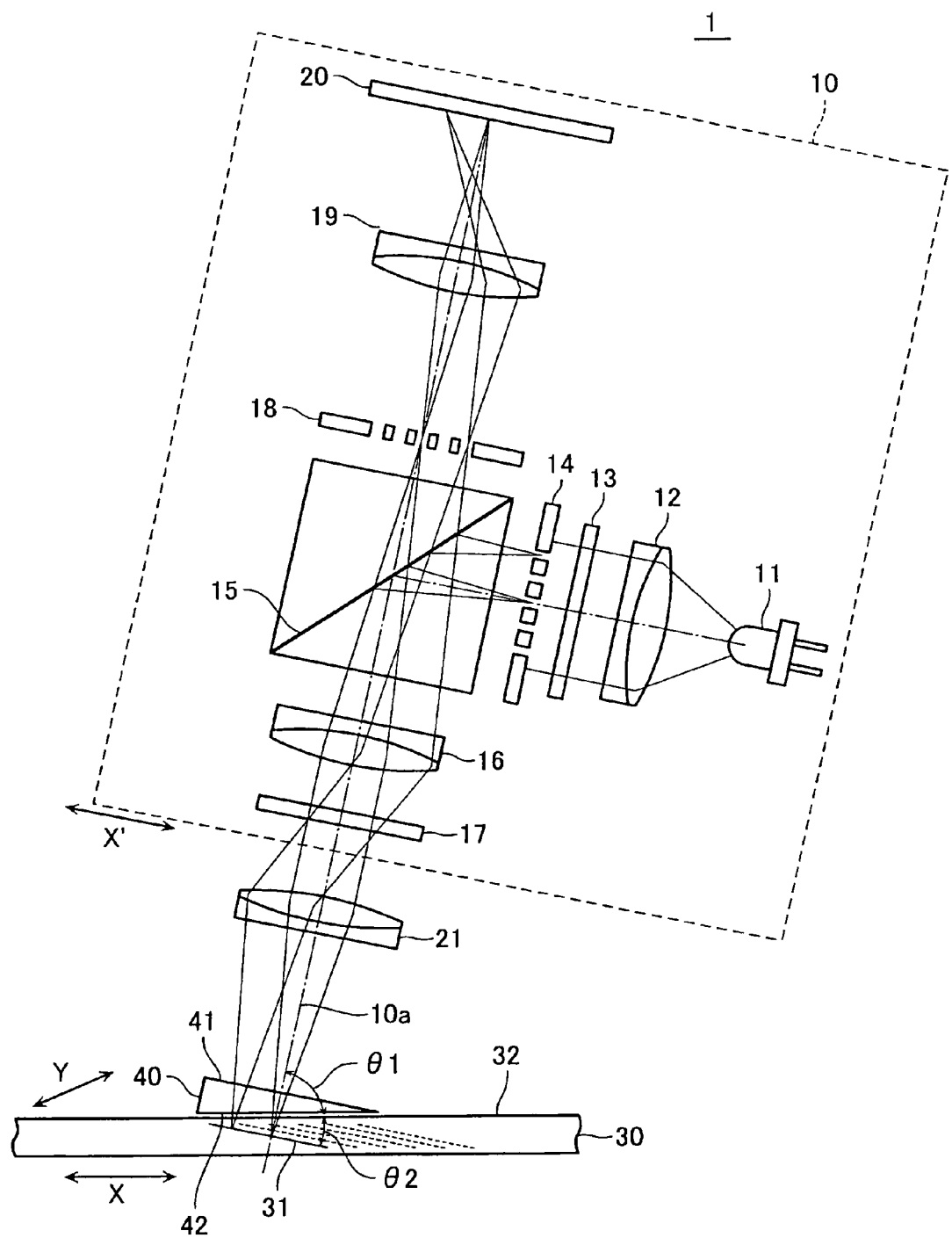
FIG. 1 is a configurational diagram showing a microscope according to an embodiment of the present disclosure.

FIG. 1 is a configurational diagram showing a microscope according to an embodiment of the present disclosure. As shown in FIG. 1, the microscope 1 includes a transparent substrate 30 in which a light-transmissive sample, for example a cell, is existent, a picture optical system 10 which reads the light of a focal plane 31 based on projection light projected onto the transparent substrate 30, in order to acquire three-dimensional information based on the picture of the sample, an objective 21 which images light projected from the picture optical system 10 toward the transparent substrate 30 onto the focal plane 31, and a wedge-shaped correction plate 40 being a wedge-shaped correction region which is arranged on the side of the picture optical system 10 on the upper surface 32 of the transparent substrate 30.

The picture optical system 10 is configured in such a manner, for example, that an optic axis 10a has an inclination of angle θ1 with respect to the upper surface 32 of the transparent substrate 30 as is parallel to the two-dimensional moving directions of X- and Y-directions indicated by arrows in the figure, while the focal plane 31 formed in the transparent substrate 30 has an angle θ2 with respect to the upper surface 32 of the transparent substrate 30. The picture optical system 10 is also configured in such a manner that the optic axis 10a becomes perpendicular (intersects orthogonally) to the focal plane 31 which intersects obliquely to the upper surface 32 of the transparent substrate 30.

Alternatively, although no illustration is made, the optic axis 10a of the picture optical system 10 may be configured in a vertical direction, while the upper surface 32 of the transparent substrate 30 may well be arranged so as to have a predetermined inclination with respect to the optic axis 10a. In this embodiment, the entrance plane 41 of the wedge-shaped correction plate 40 is arranged along a parallel direction orthogonal to the vertical direction, and the transparent substrate 30 is arranged so as to be movable in the moving directions of the X- and Y-directions indicated by the arrows in the figure, in an inclined state as it is.

The transparent substrate 30 is arranged so as to be movable in, for example, the two-dimensional moving directions of the X- and Y-directions as indicated by the arrows in FIG. 1: (A) in both the parallel state and the inclined state described above, and the picture optical system 10 and the objective 21 are configured so as to be movable in, for example, the same directions as the moving directions (that is, in the X- and Y-directions); (B) during the projection of projection light onto the sample; and also (C) a direction parallel to the focal plane 31 (that is, an X'-direction). Incidentally, since the expression "so as to be movable" signifies "so as to be capable of moving", the arrangement or configuration ought to cover a case where the constituents such as the picture optical system 10 and the objective 21, the transparent substrate 30, and the wedge-shaped correction plate 40 need not be moved, depending upon the observation situation of the sample or the use situation of the microscope 1.

Regarding the samples which are observed with the microscope 1 of this embodiment, the following arrangements are considered, for example, as follows: (1) a case where the sample exists only within the visual range of the picture optical system 10, (2) a case where the sample exists, at least, outside the visual range of the picture optical system 10, (3) a case where the sample exists outside the visual range of the picture optical system 10 and exists over in the X- and Y-directions, (4) a case where the sample exists over in the X- and Y-directions, and in addition to other sample arrangements not described above.

In a case where the focal plane 31 is longer (larger) than the visual range (visual field) of the picture optical system 10 (for example, in a case where the thickness of the sample is large), or in an example corresponding to the above case (2) where the sample exists, at least, outside the visual range of the picture optical system 10, on such an occasion, when the whole section of the sample is to be observed, the picture optical system 10, for example, is moved in the X'-direction indicated by an arrow in FIG. 1.

In addition, with regard to the relations of the movements of the sample and the transparent substrate 30, and the picture optical system 10 and the objective 21 (the sorts of the movements), these movements are not performed when the sample is in case (1), and the movement (C) is performed when the sample is in the case (2). Besides, when the sample is in the case (3), the movement (C) and the movements (A) or (B) are performed, and when the sample is in the case (4), the movements (A) or (B) are performed.

The wedge-shaped correction plate 40 has light-transmissivity, is formed in a wedge shape in which the entrance plane 41 for the light from the picture optical system 10 becomes parallel to the focal plane 31 and in which an exit plane 42 for light into the transparent substrate 30 becomes parallel to the upper surface 32 of the transparent substrate 30, and is made of a solid substance which has a refractive index n substantially equal to that of the transparent substrate 30. The wedge-shaped correction plate 40 may comprise a light-transmissive member that is molded in a wedge shape and which is filled up with a liquid, and it is preferred that the inclination angle of the entrance plane 41 be adjustable at will.

In such a configuration where the wedge-shaped correction region is configured to comprise a liquid layer instead of the wedge-shaped correction plate 40, the interspace between the transparent substrate 30 on which the sample is placed and the objective 21 is immersed in the liquid layer, and the arrangement relation between the upper surface 32 of the transparent substrate 30 and the exit plane of the objective 21 becomes a wedge shape, though not shown. Further, as to the wedge-shaped correction region, sample configurations can comprise any one of the following, including one in which the sample is directly held in a wedge shape by the objective 21 immersed in a liquid, one in which the sample is supported in a wedge shape together with a liquid layer by a plurality of transparent substrates 30, one in which the sample is directly interposed in a wedge shape between the objective 21 and the transparent substrate 30 that are immersed in a liquid, or other similar configurations.

In one embodiment, the refractive index n of the wedge-shaped correction plate 40 is identical to the refractive index of the transparent substrate 30. This refractive index n should preferably be, for example, on the order of 1.4 to 1.6, and when it is set on this order, the picture of the sample can be obtained satisfactorily in practical use.

In addition, the wedge-shaped correction plate 40 can be arranged, for example in the following ways: (a) so as to be movable in interlocking with the transparent substrate 30, the picture optical system 10 and the objective 21, (b) so as to be movable without interlocking with them, or (c) so as not to be movable.

In (a), the wedge-shaped correction plate 40 is arranged so as to be movable relative to the transparent substrate 30 in a manner to cover the illuminable region of the light projected onto the transparent substrate 30, with the X- and Y-directional motions of the picture optical system 10 and the objective 21.

In (b), the wedge-shaped correction plate 40 is arranged (b-1) so as to be movable in the moving direction of the transparent substrate 30, (b-2) so as to be movable in the X- and Y-directions of the picture optical system 10 and the objective 21, or (b-3) so as to be movable in the X'-direction.

In addition, when these movements are considered in combination with the types of movements described above, the wedge-shaped correction plate 40 falls into (c) where it does not move, in case of the movement (A), it performs the movement (a) in case of the movement (B), and it falls into (c) where it does not move, in case of the movement (C).

In accordance with such a configuration, it is possible to realize a structure in which a depth in the direction of the optic axis in the microscope 1 relative to the sample of the transparent substrate 30 (that is, a depth in the direction of a Z-axis) is held constant during the X'-directional motion or the X- and Y-directional motions stated above. Incidentally, the depth in the direction of the optic axis, relative to the sample can be varied depending upon the visual range of the microscope 1 (a picture acquirable range) and the inclination degree of the picture optical system 10. The inclination degree of the picture optical system 10 can be determined in correspondence with the wedge angle of the wedge-shaped correction plate 40 (the angle defined between the entrance plane 41 and the exit plane 42).

Furthermore, it is possible to apply a picture optical system from any of all general microscopes (especially, confocal scanning microscopes of all schemes) as the picture optical system 10 of the microscope 1 of the present disclosure. In other words, it is possible to employ the picture optical system of any of all of the general microscopes known in the art, including for example, a confocal scanning microscope which can use transmitted light, reflected light or fluorescence, a confocal microscope of fluorescence laser scanning type, or a confocal scanning microscope which adopts a Nipkow disk scheme or a DMD scheme as the picture optical system 10.

Under such a configuration, the picture optical system 10 of this embodiment includes, for example, a light source 11, a collimator lens 12, a polarization plate 13, a pinhole member 14 and a polarizing beam splitter 15. Besides, the picture optical system 10 includes an imaging lens 16, a ¼λ plate 17, a pinhole member 18, a relay lens 19 and a CCD device 20.

The light source 11 can be configured to comprise a laser diode which outputs a laser beam being projection light, and it outputs the laser beam being excitation light which is projected onto the sample, at a predetermined frequency. The collimator lens 12 turns the laser beam from the light source 11, into parallel light. The polarization plate 13 changes the laser beam that is passed through the collimator lens 12 into rectilinearly polarized light which oscillates in one direction. In addition, the pinhole member 14 is arranged at a position that makes the laser beam become the parallel light through the collimator lens 12 (the position of the focal distance of the imaging lens 16).

The polarizing beam splitter 15 splits the light entered through the polarization plate 13 in accordance with the polarization components of the light, and it transmits the P polarization component therethrough and reflects the S polarization component therefrom. Since the polarizing beam splitter 15 as well as the polarization plate 13 and the ¼λ plate 17 are used, insufficiency in brightness can be improved, and interference effects ascribable to reflected lights from the surfaces of the constituents of the microscope, etc. can be reduced, so that the sample is permitted to be clearly observed.

The light reflected by the polarizing beam splitter 15 is passed through the imaging lens 16 and the ¼λ plate 17 and is converted into circularly polarized light. The circularly polarized light is projected onto the transparent substrate 30 through the wedge-shaped correction plate 40 by the objective 21 and is imaged on the focal plane 31 which is formed obliquely to the upper surface 32 of the transparent substrate 30.

In addition, light retroceding from the focal plane 31 of the transparent substrate 30 is passed through the wedge-shaped correction plate 40, the objective 21, the ¼λ plate 17 and the imaging lens 16 and is converted into rectilinearly polarized light again, whereupon the rectilinearly polarized light is transmitted through the polarizing beam splitter 15 and guided to the pinhole member 18.

The pinhole member 18 plays the role of removing reflected light from any other place than focal points, in order to obtain the information items of only focal positions by the CCD device 20. The relay lens 19 images the light passed through the pinhole member 18 onto the CCD device 20. The CCD device 20 receives the light imaged on its image pickup plane through the pinhole member 19, and acquires the three-dimensional information of the sample. In a case where the sample exists outside the visual range of the picture optical system 10, such acquisition of the three-dimensional information of the sample is performed in such a way that the picture optical system 10 and the objective 21 are moved in the X- and Y-directions or the X'-direction along the focal plane 31 by a drive system not shown.

In embodiments where the sample exists outside the visual range of the picture optical system 10 and exists over in the X- and Y-directions as stated in the above case (3), the motions along the focal plane 31 are continued again by moving the transparent substrate 30 one visual range component in the moving directions, whereby three-dimensional information based on information items focused in all the thickness directions of the sample can be acquired easily without changing the focal depth. Incidentally, as described above, the picture optical system 10 is capable of adopting any of all the configurations of the ordinary microscope, the confocal microscope, the interference microscope, etc.

According to the microscope 1 of one embodiment of the present disclosure, the optic axis 10a of the picture optical system 10 and the focal plane 31 in the transparent substrate 30 are formed having the predetermined inclination. The wedge-shaped correction plate 40 is made having the refractive index n substantially equal to that of the transparent substrate 30. Therefore as a result, volumetric observation of the sample according to the present disclosure can be performed in such a way that the information items focused in all the thickness directions within the sample are obtained at a high speed, without additionally having to move the focal plane formed in the transparent substrate in the depth direction along the optic axis, move the picture optical system in the depth direction, or make corrections by the objective or the picture processing, as required in the conventional prior-art confocal microscope, in order to obtain the information items of the sample (in other words, without involving vertical motions of the picture optical system 10, and so on).

Furthermore, even in the case (2) where the sample exists, at least, outside the visual range of the picture optical system 10, the movements of the picture optical system 10 and the objective 21, or the transparent substrate 30 and so on, may be performed merely in the two dimensions as described above, so that high-speed volumetric observation or distribution observation of the sample, acquisition of the three-dimensional information, and so on can be similarly performed with ease.

In addition, according to the microscope 1 of the present disclosure, three-dimensional information based on the information items focused in all the thickness directions within the sample can be obtained by the simple configuration in which the wedge-shaped correction plate 40 is arranged on the upper surface 32 of the transparent substrate 30 with the picture optical system 10 set perpendicularly or inclined, and without involving the vertical motion of the transparent substrate 30, the picture optical system 10 or the like as commonly known in the prior art, so that reduction in cost can be attained while the smaller size and lighter weight of the whole apparatus are realized.

In particular, the picture of the sample at the focal plane 31 as is obtained by the microscope 1 becomes a picture as if the sample were sliced obliquely and cut out elliptically, in a case where the focal plane 31 is formed obliquely to the sample, and hence, the sample is long in the X- and Y-directions and has a round-bar-like external shape by way of example. Accordingly, in such a case where a plurality of samples contained within the visual range of the picture optical system 10 exist in the X- and Y-directions of the transparent substrate 30, the distribution state, or the like of the samples can be obtained as information without involving any motion along the optic axis of the picture optical system 10, so that the multilevel/spatial positional relations of the samples, etc. can be grasped with ease.

Figure 2:
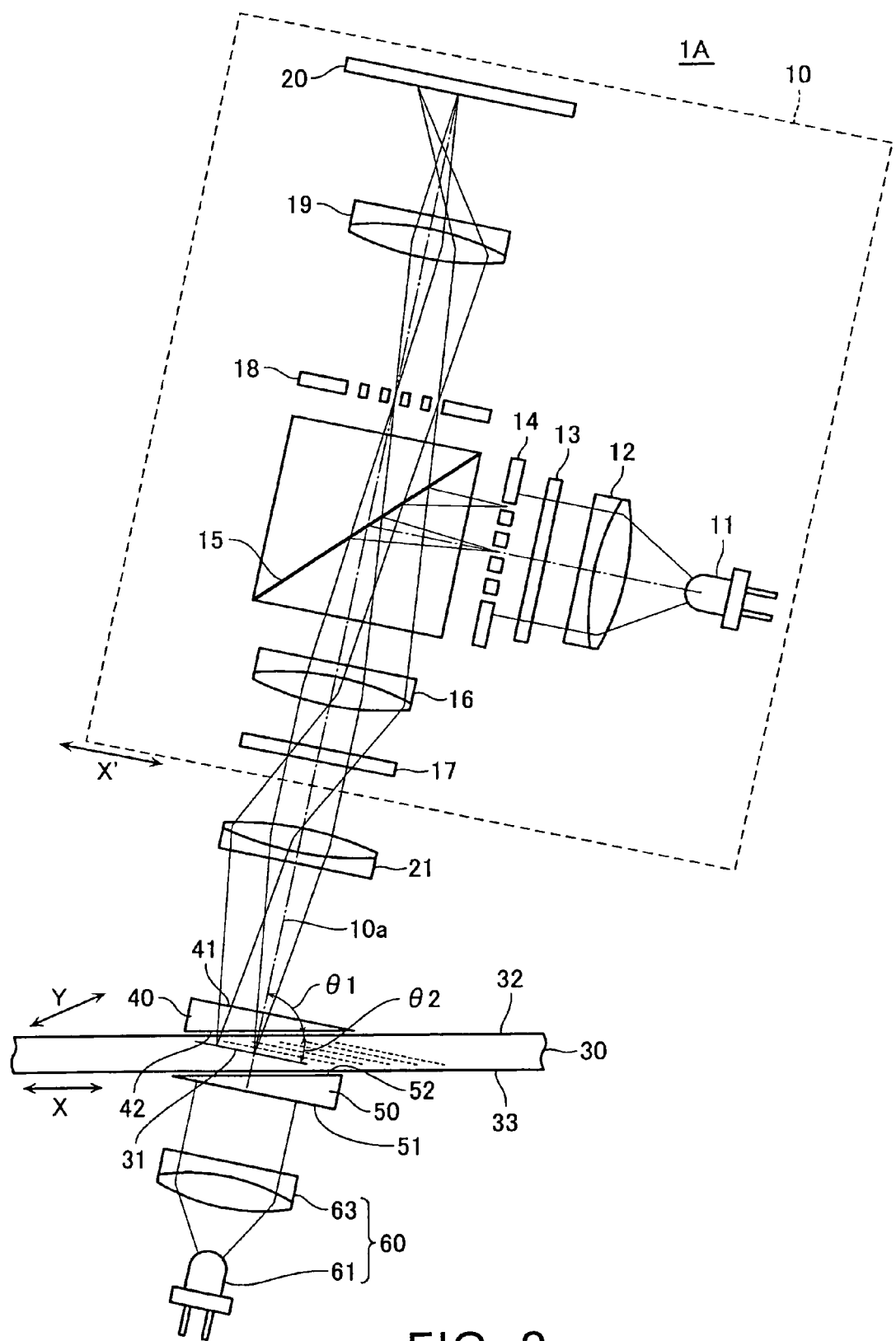
FIG. 2 is a configurational diagram showing a microscope according to another embodiment of the present disclosure.

FIG. 2 is a configurational diagram showing an example of a microscope according to another embodiment of the present disclosure. Hereinafter, portions which overlap the parts already explained shall be assigned the same numerals and signs and omitted from description. As shown in FIG. 2, the microscope 1A differs from the foregoing microscope 1 in the point of configuration by including an illumination system 60 which projects illumination light (transmitted light) having an optic axis parallel to the optic axis 10a of the laser beam, and a subsidiary wedge-shaped correction plate 50 being a subsidiary wedge-shaped correction region which is arranged on the lower surface 33 of the transparent substrate 30 on the side of the illumination system 60.

As shown in FIG. 2, the illumination system 60 is arranged on the side opposite to the picture optical system 10 with the transparent substrate 30 interposed therebetween, and it is configured to include, for example, a light source 61 and a collimator lens 63. The subsidiary wedge-shaped correction plate 50 is arranged so as to become symmetric to the wedge-shaped correction plate 40 with respect to the optic axis 10a of the laser beam, with the transparent substrate 30 interposed therebetween, and it is made of a solid substance having a refractive index n substantially equal to that of the transparent substrate 30, likewise to the wedge-shaped correction plate 40, or a liquid layer whose configuration is as described above.

The subsidiary wedge-shaped correction plate 50 is formed in a wedge shape in which its entrance plane 51 for the illumination light from the light source 61 of the illumination system 60 becomes parallel to the focal plane 31, and in which its exit plane 52 for the illumination light into the transparent substrate 30 becomes parallel to the lower surface 33 of the transparent substrate 30. Although the subsidiary wedge-shaped correction plate 50 is employed for minimizing the distortion of the illumination light of the illumination system 60 at the time when the sample is observed with the transmitted light from the light source 61, it is not an indispensable constituent and is not limited to the configuration arrangement described above. Since the remaining configuration is the same as in the foregoing microscope 1, it shall be omitted from description here.

According to the microscope 1A thus configured, the same advantage as that of the foregoing microscope 1 is attained, that is to say, the three-dimensional information of the sample can be easily acquired by obtaining information items focused in all thickness directions within the sample, and also, the backside illumination system of the transparent substrate 30 can be realized.

Figure 3:
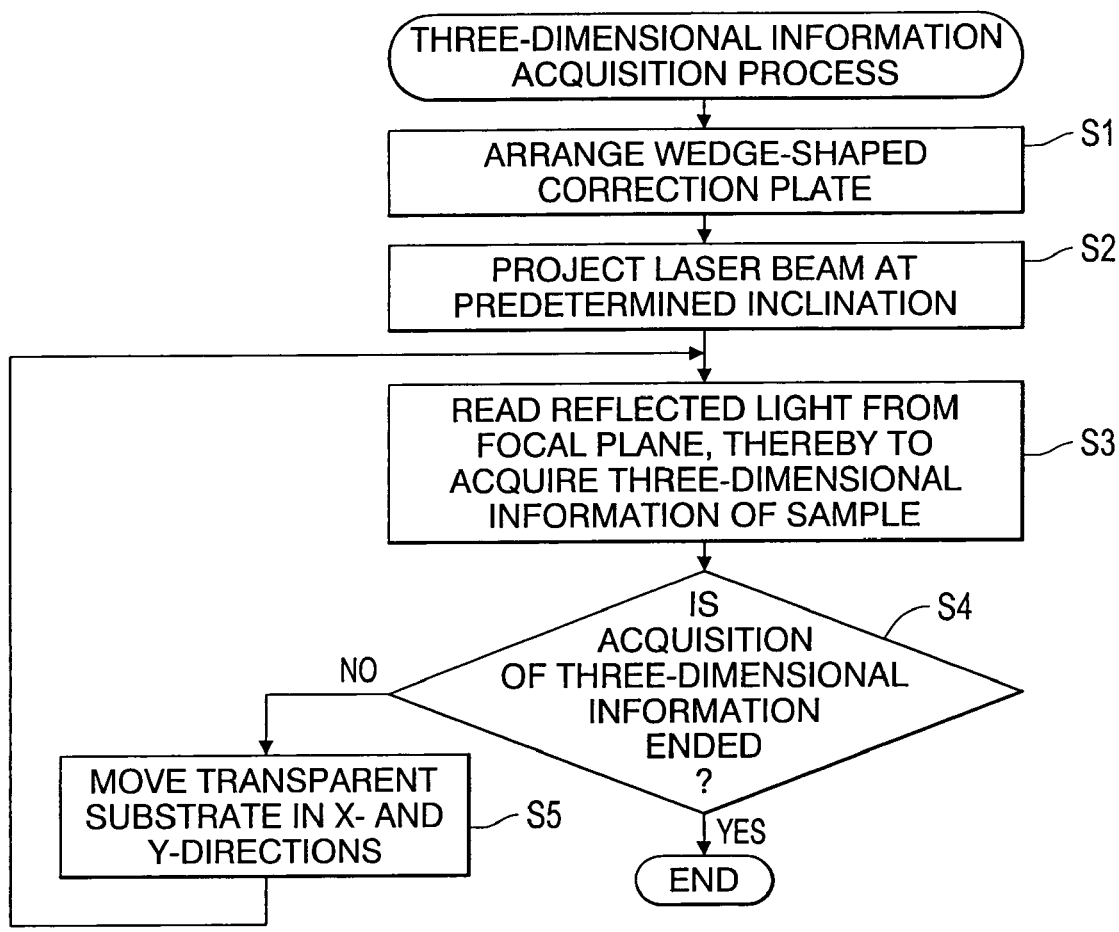
FIG. 3 is a flow chart showing an example of a three-dimensional information acquisition process for a sample employing the microscope according to one embodiment of the present disclosure.
Figure 4:
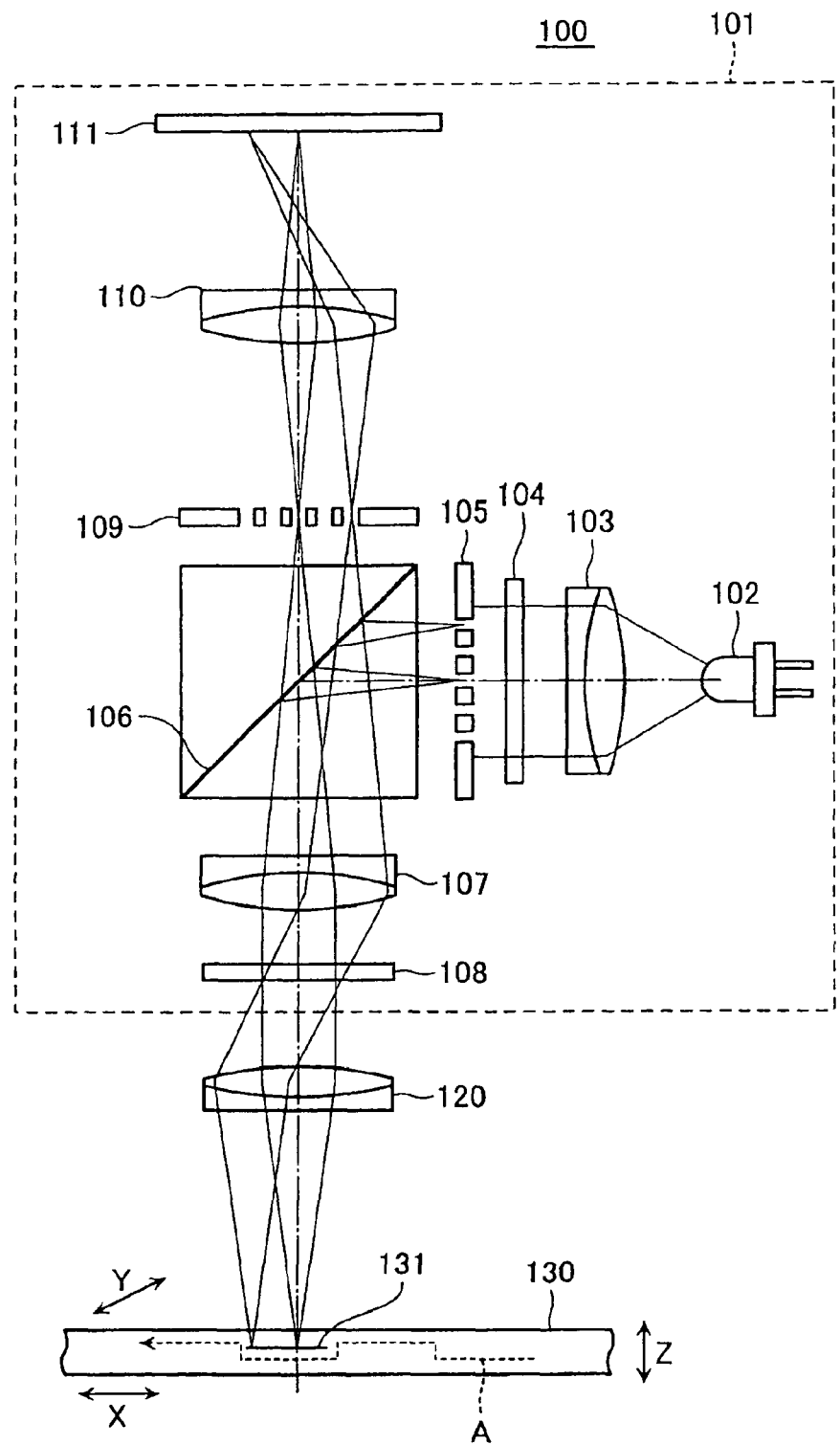
FIG. 4 is a configurational diagram of a prior-art confocal scanning microscope.

FIG. 3 is a flow chart showing an example of a three-dimensional information acquisition process for the sample employing a microscope 1 according to one embodiment of the present disclosure. Hereinafter, portions which overlap the parts already described shall be assigned the same numerals and signs and omitted from description.

As shown in FIG. 3, the wedge-shaped correction plate 40 is arranged on the upper surface 32 of the transparent substrate 30 in which the sample is supported, on the side of the picture optical system 10 (step S1). Subsequently, the laser beam is emitted from the light source 11 of the picture optical system 10 which is arranged with the predetermined inclination to the upper surface 32 of the transparent substrate 30, whereby the laser beam is projected onto the transparent substrate 30 at the predetermined inclination through the objective 21 and the wedge-shaped correction plate 40 (step S2).

In the case (2), for example, where the sample exists, at least, outside the visual range of the picture optical system 10, the types of movements described above are considered. With the laser beam held projected, the picture optical system 10 and the objective 21 are moved in the direction parallel to the focal plane 31 (the X'-direction in FIG. 1 or 2), the transparent substrate 30 is moved in the two-dimensional moving directions (the X- and Y-directions in FIG. 1 or 2) without moving the picture optical system 10 or the objective 21, or the picture optical system 10 and the objective 21 are moved in these directions without moving the transparent substrate 30, whereupon the reflected light from the focal plane 31 of the transparent substrate 30 is read by the CCD device 20 of the picture optical system 10, thereby to acquire the three-dimensional information of the sample based on the information items focused in all the thickness directions within the sample (step S3). A determination of whether or not acquisition of the three-dimensional information is completed is then made (step S4). In a case where the acquisition is ended ("Y" at step S4), the series steps of the three-dimensional information acquisition process based on this flow chart as shown in FIG. 3 is ended.

On the other hand, in a case where the acquisition is not completed ("N" at the step S4), as for example, in the case (3) where the sample exists outside the visual range of the picture optical system 10 and exists over in the X- and Y-directions, the transparent substrate 30 is moved in the moving directions (the X- and Y-directions in FIG. 1 or 2) (step S5), whereupon the process is shifted to step S3, at which the three-dimensional information of the sample is acquired after moving the picture optical system 10 and the objective 21 in the X'-direction, moving the transparent substrate 30 in the X- and Y-directions, or moving the picture optical system 10 and the objective 21 in the X- and Y-directions, followed by the subsequent processing.

In the case (1) where the sample exists only within the visual range of the picture optical system 10, it is as described above that the motion/motions in the X'-direction or the X- and Y-directions as described above are unnecessary. In a case where the sample is observed by moving the picture optical system 10, etc. or the transparent substrate 30 at fine pitches within, for example, the visual range of the picture optical system 10, without moving the picture optical system 10, etc. or the transparent substrate 30 every visual range (in other words, without moving them or it in correspondence with one picture frame), a large number of slice planes as indicated by broken lines in FIG. 1 or FIG. 2 can be taken, and the interior of the sample can be observed more particularly.

According to such a three-dimensional information acquisition process for the sample, after the wedge-shaped correction plate 40 has been arranged on the upper surface 32 of the transparent substrate 30 supporting the sample therein, the laser beam is projected through the wedge-shaped correction plate 40 such that the optic axis 10a and the focal plane 31 may have the predetermined inclinations to the upper surface 32 of the transparent substrate 30, respectively, whereby the three-dimensional information of the sample can be acquired. In the case (2), for example, where the sample exists outside the visual range of the picture optical system 10, the three-dimensional information of the sample can be similarly acquired merely by, for example, moving the transparent substrate 30 in the moving direction or moving the picture optical system 10, etc. in the X- and Y-directions or in the X'-direction. Therefore, any motion along the thickness direction of the sample in the transparent substrate 30 is unnecessary, and the three-dimensional information of the sample can be easily acquired by obtaining the information items focused in all the thickness directions within the sample, at a high speed.

As described above, in accordance with each of the microscopes 1 and 1A and the three-dimensional information acquisition method according to embodiments of the present disclosure, the volumetric observation of a sample or the acquisition of three-dimensional information can be performed in such a way that information items focused in all thickness directions within the sample are obtained at a high speed and with ease without requiring any motion along the thickness direction of the sample.

What is claimed is:

1. An optical system comprising an optical unit with an optical axis extending through a light transmissive sample embedded in a transparent substrate to focus on the sample embedded in the transparent substrate and to scan the sample according to a main plane of the transparent substrate, the transparent substrate having a refractive index, a surface and the main plane, and
a substantially wedge shaped transparent correction region arranged in the optical axis between the optical unit and the transparent substrate, the correction region having a first plane, a second plane, and a refraction index, the correction region having a cross-section in the form of a triangle, and being movable relative to the transparent substrate, on the surface of the transparent substrate;
wherein the optical axis extends with an angle unequal to zero relative to the normal of the main plane of the transparent substrate, and
wherein the refraction index of the correction region is substantially equal to the refraction index of the transparent substrate, the first plane of the correction region is arranged parallel to the main plane of the transparent substrate and the second plane of the correction region is arranged perpendicular to the optical axis.

2. The optical system according to claim 1, wherein the optical unit comprises a scanning microscope with an optoelectronic transducer configured to receive light according to the optical axis from the sample embedded in the transparent substrate.

3. The optical system according to claim 1, wherein the optical unit comprises a light source configured to emit light according to the optical axis to the sample embedded in the transparent substrate.

4. The optical system according to claim 1, wherein the correction region is in contact with the transparent substrate.

5. The optical system according to claim 1, wherein:
the transparent substrate is movable in two-dimensional moving directions; and
the optical unit is relatively movable during projection of projection light from the optical unit onto the sample.

6. The optical system according to claim 5, wherein the optical unit is relatively movable in either of the two-dimensional moving directions and a direction parallel to a focal plane of the correction region, in a case where the transparent substrate is not moved in the two-dimensional moving directions.

7. The optical system according to claim 1, wherein the correction region is arranged so as not to move relative to the transparent substrate, in a case where the optical unit is moved in a direction parallel to a focal plane of the correction region.

8. The optical system according to claim 1, wherein the optical unit is movable in a parallel direction during projection of projection light from the optical unit onto the sample, thereby to acquire three-dimensional information of the sample at a focal plane which is formed by a moving locus of a focus of the projection light.

9. The optical system according to claim 1, further comprising:
an illumination system arranged on a side opposite to the optical unit with the transparent substrate interposed therebetween, and which projects illumination light having an optic axis parallel to that of projection light from the optical unit; and
a subsidiary wedge-shaped correction region that is symmetric to the correction region with respect to the optic axis of the projection light, with the transparent substrate interposed therebetween, having a refractive index substantially equal to that of the transparent substrate, and a wedge shape so that a focal plane of the subsidiary wedge-shaped correction region may be arranged orthogonally to the optic axis of the illumination light from the illumination system.

10. The optical system according to claim 9, wherein the subsidiary wedge-shaped correction region is made of a light-transmissive subsidiary wedge-shaped correction plate arranged on the transparent substrate on a side of the illumination system, and is formed in such a wedge shape that an entrance plane for the illumination light from the illumination system becomes parallel to the focal plane of the subsidiary wedge-shaped correction region, while an exit plane for the illumination light onto the transparent substrate becomes parallel to the surface of the transparent substrate.

11. The optical system according to claim 1, further comprising a subsidiary wedge-shaped correction region that is symmetric to the wedge-shaped correction region with respect to the optic axis of projection light from the optical unit, with the transparent substrate interposed therebetween, wherein each of the wedge-shaped correction region and the subsidiary wedge-shaped correction region is configured of a liquid layer embracing the sample, the liquid having substantially the same refractive index as the transparent substrate.

12. A three-dimensional information acquisition method wherein projection light from a picture optical system is projected onto a light-transmissive sample, and three-dimensional information of the light-transmissive sample is acquired with light of a focal plane, the method comprising:

disposing a wedge-shaped correction region on a transparent substrate, the wedge-shaped correction region having a cross-section in the form of a triangle and a refractive index substantially equal to that of the transparent substrate; being in such a wedge shape that an optic axis of the projection light has a predetermined inclination to the sample supported in the transparent substrate, and that the focal plane is formed to be orthogonal to the optic axis; and being movable relative to the transparent substrate, on the surface of the transparent substrate; and acquiring the three-dimensional information of the sample by projecting the projection light from the picture optical system through the wedge-shaped correction region and reading light of the focal plane.

13. The three-dimensional information acquisition method according to claim 12, wherein the transparent substrate is arranged so as to be movable in two-dimensional moving directions, the picture optical system is arranged so as to be movable in the same directions as the moving directions and in a direction parallel to the focal plane during projection of the projection light onto the sample, and in a case where the sample exists over outside a visual range of the picture optical system, the light of the focal plane is read by moving the picture optical system in the parallel direction, thereby to obtain the three-dimensional information of the sample, while the picture optical system is moved again by moving the transparent substrate a predetermined magnitude in the moving directions, thereby to obtain the three-dimensional information of the sample.

14. A microscope wherein projection light is projected onto a sample, and a light-transmissive sample supported in a transparent substrate is observed with light of a focal plane of the microscope, comprising:

a picture optical system which projects projection light onto the sample, so that an optic axis of the projection light has predetermined inclination to the transparent substrate, and which reads the light of the focal plane to acquire three-dimensional information of the sample; and a wedge-shaped correction region on the transparent substrate, the wedge-shaped correction region having a cross-section in the form of a triangle and a refractive index substantially equal to that of the transparent substrate; being provided in a wedge shape so that the focal plane is orthogonal to the optic axis of the projection light from the picture optical system for the sample supported in the transparent substrate; and being movable relative to the transparent substrate, on the surface of the transparent substrate.

15. The microscope according to claim 14, wherein the wedge-shaped correction region comprises a light-transmissive wedge-shaped correction plate arranged on the transparent substrate on a side of the picture optical system, and which is formed in such a wedge shape that an entrance plane for the projection light from the picture optical system becomes parallel to the focal plane, while an exit plane for the projection light onto the transparent substrate becomes parallel to a surface of the transparent substrate.

* * * * *